United States Patent [19]

Imaizumi

[11] Patent Number: 4,558,928
[45] Date of Patent: Dec. 17, 1985

[54] FOCUSING METHOD FOR A TELEPHOTO LENS SYSTEM

[75] Inventor: Masaki Imaizumi, Tokyo, Japan

[73] Assignee: Olympus Optical Co., Ltd., Tokyo, Japan

[21] Appl. No.: 558,196

[22] Filed: Dec. 5, 1983

[30] Foreign Application Priority Data

Dec. 24, 1982 [JP] Japan .................. 57-226387

[51] Int. Cl.⁴ .................. G02B 9/64; G02B 13/02
[52] U.S. Cl. ..................... 350/454; 350/450
[58] Field of Search ................. 350/454, 450

[56] References Cited

U.S. PATENT DOCUMENTS

3,854,797 12/1974 Yokota .................. 350/454
4,437,734 3/1984 Iizuka .................. 350/454

Primary Examiner—John K. Corbin
Assistant Examiner—Rebecca D. Gass
Attorney, Agent, or Firm—Cushman, Darby & Cushman

[57] ABSTRACT

A focusing method for a telephoto lens system comprising a front lens group having positive refractive power, an intermediate lens group having negative refractive power, and a rear lens group having positive refractive power, the focusing method for telephoto lens system being arranged to divide the intermediate lens group into two subunits and to focus the lens system by moving those subunits toward the image side by varying the distance between those subunits, the focusing method thereby enabling to attain focusing with satisfactorily favorable aberrations up to an object at a short distance.

7 Claims, 12 Drawing Figures

FOCUSING METHOD FOR A TELEPHOTO LENS SYSTEM

BACKGROUND OF THE INVENTION (a) Field of the Invention

The present invention relates to a focusing method for a telephoto lens system and, more particularly, to a focusing method for a telephoto lens system of which the focal length is 180 mm and aperture ratio is large, i.e., F/1.8 or F/2.0.

(b) Description of the Prior Art

In recent years, there is increasing demand for large aperture ratio telephoto lens systems in various fields. A large aperture ratio telephoto lens system enables to take photographs at a high shutter speed. Therefore, when photographing a sport game, stage scene, etc., for example, it is possible to take photographs without causing object shaking and, consequently, the limitation in the photographing conditions is reduced. Besides, as the F-number with the full open aperture is small, it is possible to take a photograph in which the object is relieved by making the depth of field shallow and putting the things in front and rear of the object out of focus, such photography being characteristic of telephoto lens systems.

However, for a telephoto lens system with a large aperture ratio, the front lens group should be necessarily made large in diameter and should be composed of a large number of lens elements and, consequently, the front lens group becomes heavy. Therefore, in case of the conventional focusing method to advance the lens system as a whole, it is inconvenient for handling in various points, for example, the center of gravity shifts toward at the time of focusing, the helicoid becomes heavy becouse the amount of advancing movement should be made large as the focal length is long, and so forth.

Besides, the inner focusing method is also known as a focusing method for a telephoto lens system. In this method, it is difficult to keep the quality of image satisfactorily favourable up to a short distance. On the other hand, in case of the inner focusing method to move two lens components (for example, as disclosed in Japanese published examined patent application No. 39803/80), the power of one of the two lens components is weak and, consequently, the amount of movement of the other lens becomes large.

SUMMARY OF THE INVENTION

It is, therefore, a primary object of the present invention to provide a focusing method for a telephoto lens system with a large aperture ratio arranged to divide the intermediate lens group of the telephoto lens system into two subunits and to move said subunits toward the image side by varing the distance between them, said focusing method thereby enabling to focus the telephoto lens system up to an object at a short distance by keeping aberrations in the favourable state.

Figure 1:
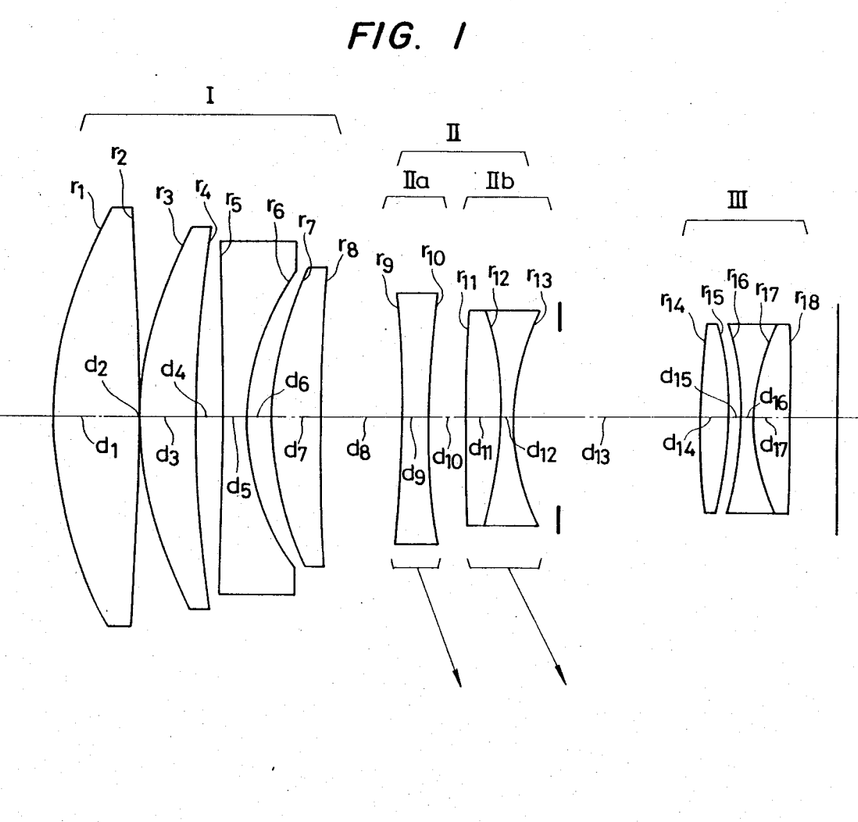
FIGS. 1 and 2 respectively show sectional view of Embodiments 1 and 2 of the present invention.
Figure 2:
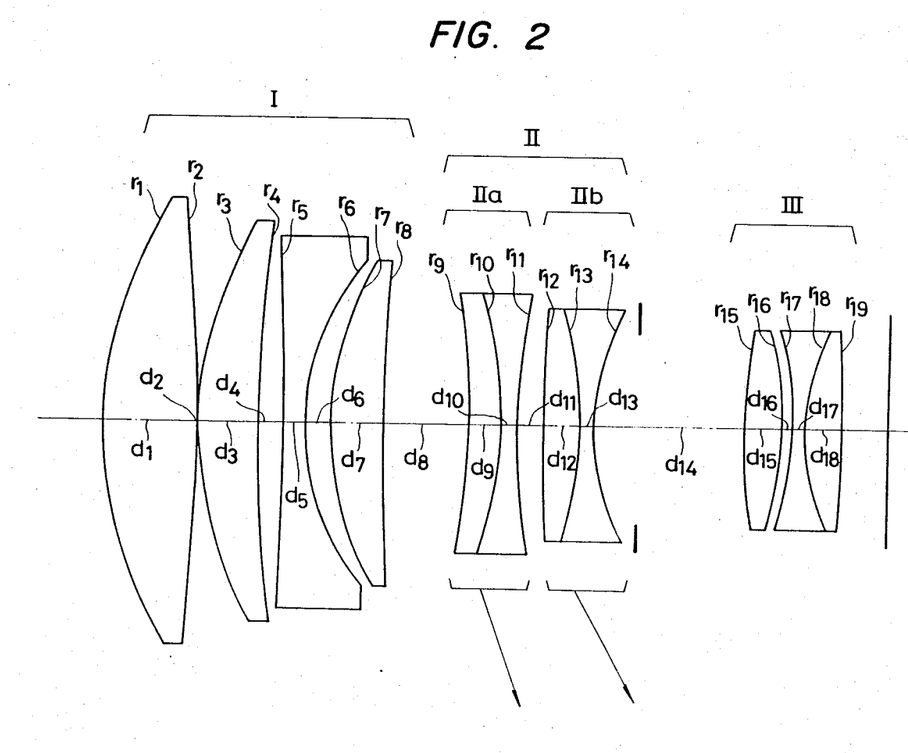

The focusing method according to the present invention is arranged to focus a telephoto lens system, which comprises a front lens group I having positive refractive power, an intermediate lens group II having negative refractive power and a rear lens group III having positive refractive power as shown in FIG. 1 or 2, by dividing said intermediate lens group II into two subunits, i.e., a first subunits IIa and a second subunit IIb, and by moving said first subunit IIa and second subunit IIb toward the image side by varying the distance between said two subunits as shown by arrow marks in FIG. 1 or 2.

A focusing method to focus a lens system by integrally moving the intermediate lens group toward the image side is known already. In said method, however, heights of paraxial rays which enter the intermediate lens group having negative refractive power become low and the diverging action for the rays becomes weak. As a result, spherical aberration tends to be undercorrected and, especially when the lens system is focused on an object at a short distance, spherical aberration is undercorrected considerably. Besides, as for coma, the diverging action for lower rays becomes weak and, consequently, lateral aberration shows strong tendency to become a "plus" value. Moreover, as for astigmatism, the diverging action for the rays becomes weak and, therefore, the aberration curve of astigmatism inclines toward the "minus" direction.

The focusing method accroding to the present invention eliminates the above-mentioned disadvantages by arranging to divide the intermediate lens group into two subunits and to focus the lens system by moving those subunits toward the image side by varying the distance between them.

Besides, the effect for eliminating the above-mentioned disadvantages of the known focusing method to integrally move the intermediate lens group further increases when it is arranged to fulfill the conditions (1) and (2) shown below where reference symbol $\phi_a$ represents the power of the first subunit IIa, i.e., the subunit on the object side out of the two subunits into which the intermediate lengs group II is divided, reference symbol $\phi_b$ represents the power of the second subunit IIb on the image side, and reference symbols $x_a$ and $x_b$ respectively represent the amounts of movements of the subunits IIa and IIb at the time of focusing.

$$0.7 < \phi_b/\phi_a < 1.5 \tag{1}$$

$$1 < x_b/x_a \tag{2}$$

The first subunit IIa in the above-mentioned intermediate lens group comprises a surface with strong diverging action or the first subunit IIa as a whole has strong diverging action. When said subunit IIa is moved toward the image side, heights of rays on respective lens surfaces in said subunit IIa become low and, consequently, the above-mentioned diverging actin becomes weak. Therefore, when the first subunit IIa is moved toward the image side, spherical aberration varies toward the "minus" direction. Besides, when said subunit IIa having a certain degree of power is moved toward the image side, the object point is shifted toward the lens system. Therefore, the focusing action is attained when the subunit IIa is moved toward the image side.

The second subunit IIb on the image side in the intermediate lens group II has negative refractive power and, at the same time, has a surface with positive refractive power (for example, the cemented surfaces of embodiments shown later). When said second subunit IIb is moved toward the image side, heights of rays on respective lens surfaces become low, action for converging the rays at the above-mentioned surface with positive refractive power becomes weak and, consequently, spherical aberration tends to vary toward the "plus" direction. Besides, as the second subunit IIb also has a certain degree of power, the object point is shifted toward the lens system when the subunit IIb is moved toward the image said and, consequently, the focusing action is attained.

It is possible to keep spherical aberration in the favourable state when the amounts of movements of the first subunit IIa and second subunit IIb in the intermediate lens group II, which have the above-mentioned actions, are decided so that the decrease in the diverging action, which occurs when the first subunit IIa is moved toward the image said, becomes small so as to thereby generally balance the tendency that spherical aberration varies toward the "minus" direction as the diverging action of the first subunit IIa decreases when both of the first subunit IIa and second subunit IIb in the intermediate lens group II are simultaneously moved toward the image side, the tendency that spherical aberration varies toward the "plus" direction as the converging actin is the second subunit IIb decreases at that time, and the tendency that the curve of spherical aberration, which is caused by the front lens group I having positive refractive power, inclines toward the "minus" direction because the object point is shifted toward the lens system by the movements of the first and second subunits IIa and IIb. Besides, by arranging that both of the subunits IIa and IIb respectively have certain degrees of powers, both subunits function to shift the object point toward the lens system and, therefore, the focusing action is attained.

In this case, by selecting the powers $\phi_a$ and $\phi_b$ of the two subunits within the range defined by the aforementioned condition (1), it is possible to arrange so that the action of the first subunit IIa to shift the object point from the infinite distance toward the lens system becomes approximately equal to the action of the second subunit IIb to shift the object point toward the lens system. Therefore, it is not necessary to largely move either one of the two subunits and, moreover, the amount of movement of the intermediate lens group II as a whole which has negative power is also made small. Therefore, the space required for focusing also becomes small.

If the value of $\phi_b/\phi_a$ becomes smaller than the lower limit of the condition (1), the focusing action of the second subunit IIb becomes weak and the amount of movement of the second subunit IIb becomes large. Therefore, it is impossible to balance the action to make spherical aberration caused by the second subunit IIb overcorrected with the action to make spherical aberration caused by the front lens group I and the first subunit IIa undercorrected. If the value of $\phi_b/\phi_a$ becomes larger than the upper limit of the condition (1), the focusing action of the first subunit IIa becomes weak and, therefore, the amount of movement of the first subunit IIa becomes large. As a result, the first subunit IIa approaches the second subunit IIb to the degree that it is impossible to reserve a distance to the second subunit IIb, and this is not desirble.

The condition (2) is established in order to prevent the amount of movement of the first subunit IIa from becoming large and to thereby keep the incident heights of rays on the first subunit IIa high in order to thereby prevent spherical aberration from being inclined by the first subunit IIa toward the "minus" direction. By the above-mentioned arrangement, the tendency that spherical aberration by the first lens group I having positive refractive power varies toward the "minus" direction is balanced by the two subunits IIa and IIb in the intermediate lens group II. Therefore, if the value of $x_b/x_a$ becomes smaller than the lower limit of the condition (2), the amount of movement of the first subunit IIa becomes large and spherical aberration cannot be balanced. Besides, if the condition (2) is not fulfilled, heights of offaxial rays on the diverging surfaces become low and, consequently, coma by lower rays and astigmatism become unfavourable.

When the focusing method according to the present invention described so far is adopted, i.e., when the intermediate lens group II of a telephoto lens system comprising a front lens group I having positive refractive power, intermediate lens group II having negative refractive power and rear lens group III having positive refractive power is divided into two subunits IIa and IIb and said telephoto lens system is focused by moving said subunits IIa and IIb toward the image side by varying the distance between them, the paraxial rays will be eclipsed by the front lens group I as the lens system is focused on an object at a shorter distance. To prevent the paraxial rays from being eclipsed, the diameter of the front lens group I should be made large. In that case, the front lens group I becomes heavy, and it is not suitable for practical use. Besides, unless the diameter of the lens system is made large, the rays will be eclipsed and, consequently, a portion where the stop is not effective at all will be caused when the stop is stopped down from the open aperture especially when the lens system is focused on an object at a short distance.

In the present invention, the above-mentioned disadvantage is eliminated by stopping down the stop so that the aperture NA' on the exit side has the relation expressed as $NA'=NA/(1+\beta)$ (where, reference symbol NA represents the numerical aperture on the exit side when the lens system is focused on an object at the infinite distance, and reference symbol $\beta$ represents the lateral magnification when the lens system is focused on an object at a finite distance) when the distance to the object becomes shorter. Thus, it is possible to focus the lens system without causing decrease in the quality of image when the lens system is focused on an object at a short distance, the diameter of the front lens does not become large and, when photographing by using a Strobo light or the like by setting the photographing conditions manually, it is possible to accurately decide the exposure by using the following formula:

$$\text{Effective F-number} = \text{F-number when focused at infinite distance} \times (1 + \beta)$$

Besides, in the present invention, the stop may be moved together with the subunit IIa or IIb as illustrated by the embodiments shown later or may be kept fixed at an arbitrary position.

DETAILED DESCRIPTION OF THE PREFERRED EMBODIMENTS

Now, preferred emodiments of the focusing method for a telephoto lens system according to the present invention are shown below.

Embodiment 1
$f = 100, F/2.0, 2\omega = 13.7°$ $r_1 = 49.723$
$d_1 = 10.27$  $n_1 = 1.49700$  $\nu_1 = 81.61$
$r_2 = -295.473$
$d_2 = 0.20$
$r_3 = 46.505$
$d_3 = 6.66$  $n_2 = 1.61700$  $\nu_2 = 62.79$
$r_4 = 171.355$
$d_4 = 3.00$
$r_5 = -576.598$
$d_5 = 2.73$  $n_3 = 1.65412$  $\nu_3 = 39.70$
$r_6 = 30.885$
$d_6 = 2.78$
$r_7 = 39.886$
$d_7 = 6.09$  $n_4 = 1.49700$  $\nu_4 = 81.61$
$r_8 = 336.723$
$d_8$ (variable)
$r_9 = -163.418$
$d_9 = 3.10$  $n_5 = 1.50378$  $\nu_5 = 66.81$
$r_{10} = 99.461$
$d_{10}$ (variable)
$r_{11} = 320.766$
$d_{11} = 3.89$  $n_6 = 1.68893$  $\nu_6 = 31.08$
$r_{12} = -49.512$
$d_{12} = 1.67$  $n_7 = 1.52682$  $\nu_7 = 51.12$
$r_{13} = 30.977$
$d_{13}$ (variable)
$r_{14} = 71.958$
$d_{14} = 3.67$  $n_8 = 1.78800$  $\nu_8 = 47.43$
$r_{15} = -42.169$
$d_{15} = 1.40$
$r_{16} = -39.083$
$d_{16} = 1.38$  $n_9 = 1.60342$  $\nu_9 = 38.01$
$r_{17} = 26.172$
$d_{17} = 4.13$  $n_{10} = 1.67790$  $\nu_{10} = 55.33$
$r_{18} = -833.973$
$\phi_a = -0.818$,
$\phi_b = -1.142$ Embodiment 2
$f = 100, F/1.8, 2\omega = 13.7°$ $r_1 = 51.290$
$d_1 = 10.99$  $n_1 = 1.49700$  $\nu_1 = 81.61$
$r_2 = -257.523$
$d_2 = 0.19$
$r_3 = 48.023$
$d_3 = 7.05$  $n_2 = 1.61700$  $\nu_2 = 62.79$
$r_4 = 184.055$
$d_4 = 2.95$
$r_5 = -425.917$
$d_5 = 2.82$  $n_3 = 1.65412$  $\nu_3 = 39.70$
$r_6 = 31.502$
$d_6 = 2.85$
$r_7 = 38.755$
$d_7 = 6.43$  $n_4 = 1.49700$  $\nu_4 = 81.61$
$r_8 = 396.639$
$d_8$ (variable)
$r_9 = -89.189$
$d_9 = 3.67$  $n_5 = 1.73400$  $\nu_5 = 51.49$
$r_{10} = -53.471$
$d_{10} = 2.04$  $n_6 = 1.46450$  $\nu_6 = 65.94$
$r_{11} = 85.186$
$d_{11}$ (variable)
$r_{12} = 304.044$
$d_{12} = 4.12$  $n_7 = 1.68893$  $\nu_7 = 31.08$
$r_{13} = -51.869$
$d_{13} = 1.65$  $n_8 = 1.52682$  $\nu_7 = 51.12$
$r_{14} = 29.373$
$d_{14}$ (variable)

-continued $r_{15} = 69.887$
$d_{15} = 4.44$  $n_9 = 1.78800$  $\nu_9 = 47.43$
$r_{16} = -43.890$
$d_{16} = 1.20$
$r_{17} = -42.811$
$d_{17} = 1.39$  $n_{10} = 1.61293$  $\nu_{10} = 37.00$
$r_{18} = 27.804$
$d_{18} = 4.20$  $n_{11} = 1.67790$  $\nu_{11} = 55.33$
$r_{19} = -355.714$
$\phi_a = -0.851$  $\phi_b = -1.214$ In embodiments shown in the above, reference symbols $r_1$, $r_2$, ... respectively represent radii of curvature of respective lens surfaces, reference symbols $d_1$, $d_2$, ... respectively represent thicknesses of respective lenses and airspaces between respective lenses, reference symbols $n_1$, $n_2$, ... respectively represent refractive indices of respective lenses, reference symbols $\nu_1$, $\nu_2$, ... respectively represent Abbe's numbers of respective lenses, and reference symbol f represents the focal length of the lens system as a whole.

The table in the following gives the values of airspaces $d_8$, $d_{10}$ and $d_{13}$ and values of $x_a$ and $x_b$ of respective embodiments shown in the above when they are focused on the object points at the infinite distance and short distances respectively.

TABLE

| Embodiment 1 | | | | | |
|---|---|---|---|---|---|
| Object point | $d_8$ | $d_{10}$ | $d_{13}$ | $x_a$ | $x_b$ |
| ∞ | 9.80 | 4.58 | 22.00 | | |
| −3056 | 12.01 | 4.82 | 19.55 | −2.21 | −6.81 |
| −1031 | 16.61 | 5.65 | 14.13 | −2.45 | −7.88 |
| Embodiment 2 | | | | | |
| Object point | $d_8$ | $d_{11}$ | $d_{14}$ | $x_a$ | $x_b$ |
| ∞ | 10.19 | 3.04 | 17.92 | | |
| −3000 | 12.34 | 3.28 | 15.53 | −2.15 | −6.55 |
| −1011 | 16.74 | 4.36 | 10.05 | −2.39 | −7.87 |

In the Table shown in the above, the "minus" signs given to the amounts of movements $x_a$ and $x_b$ mean that the subunits IIa and IIb are moved toward the image side.

Figure 3:
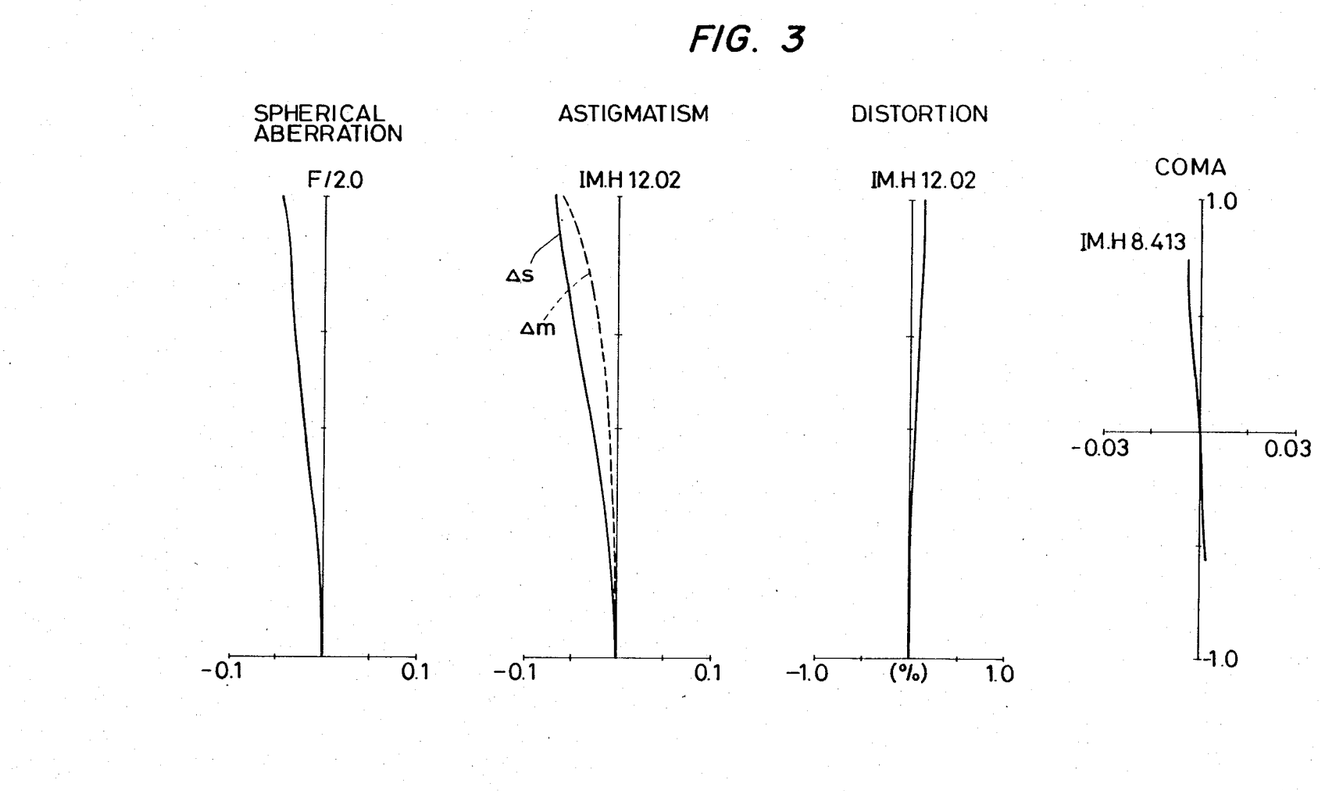
FIGS. 3 through 5 respectively show graphs illustrating aberration curves of Embodiment 1.
Figure 4:
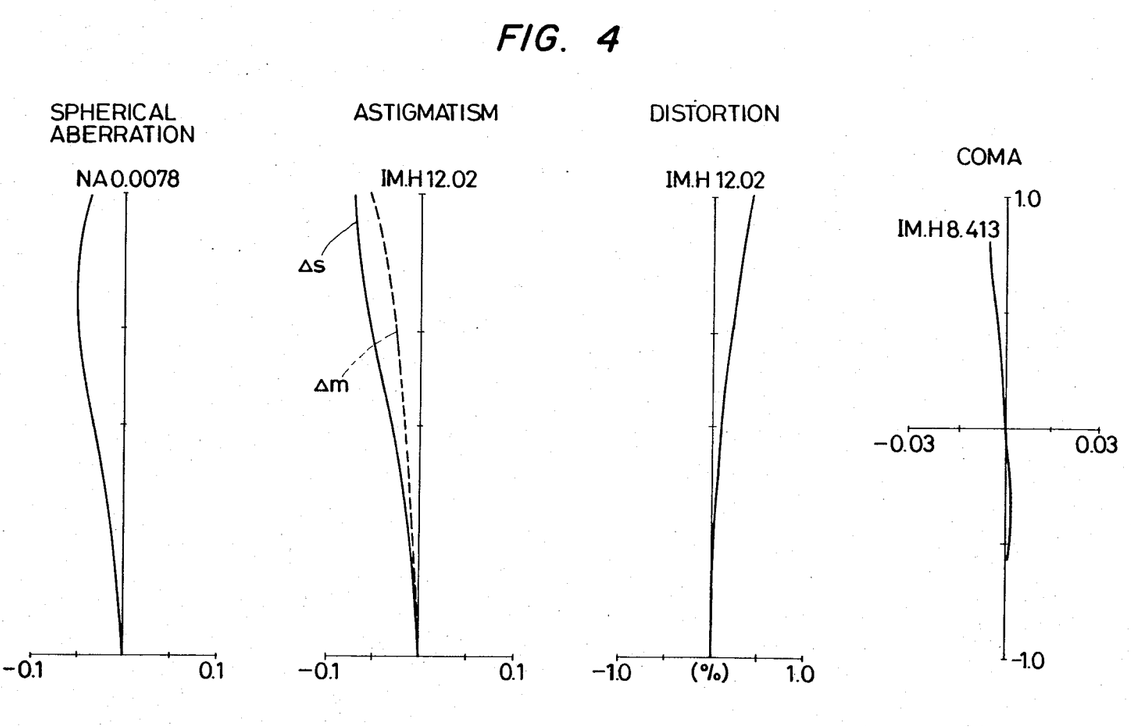
Figure 5:
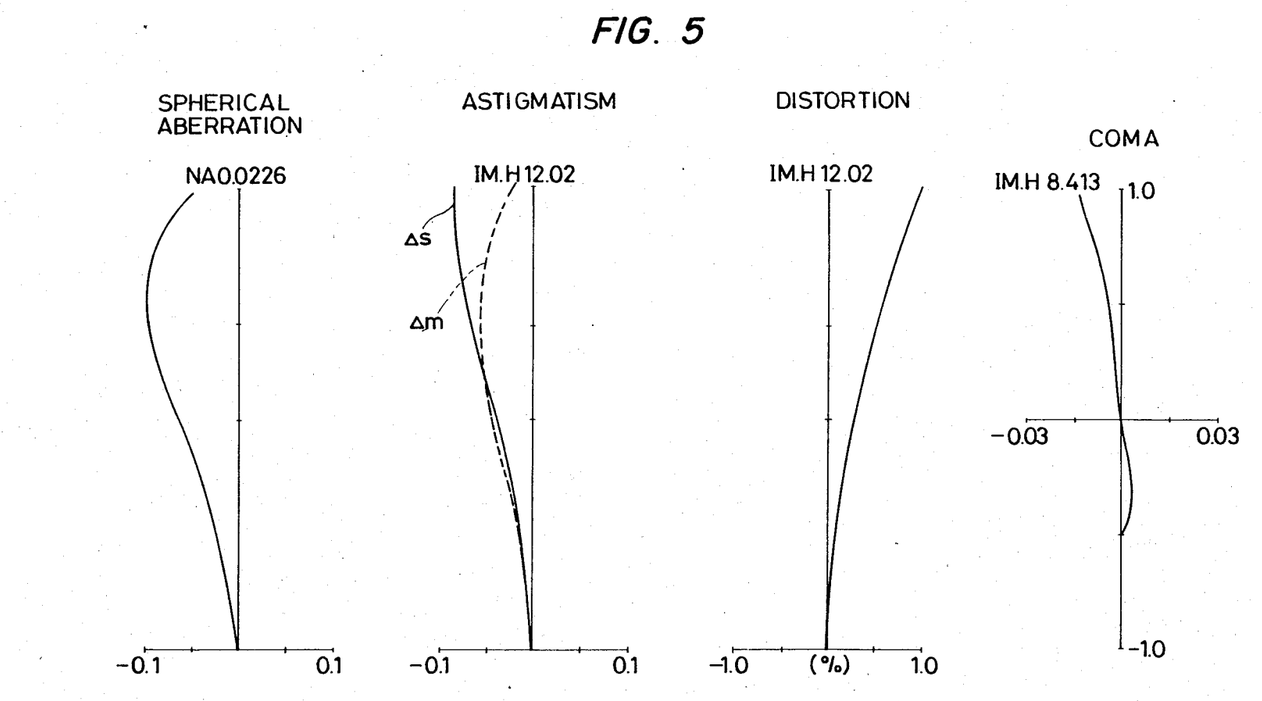
Figure 6:
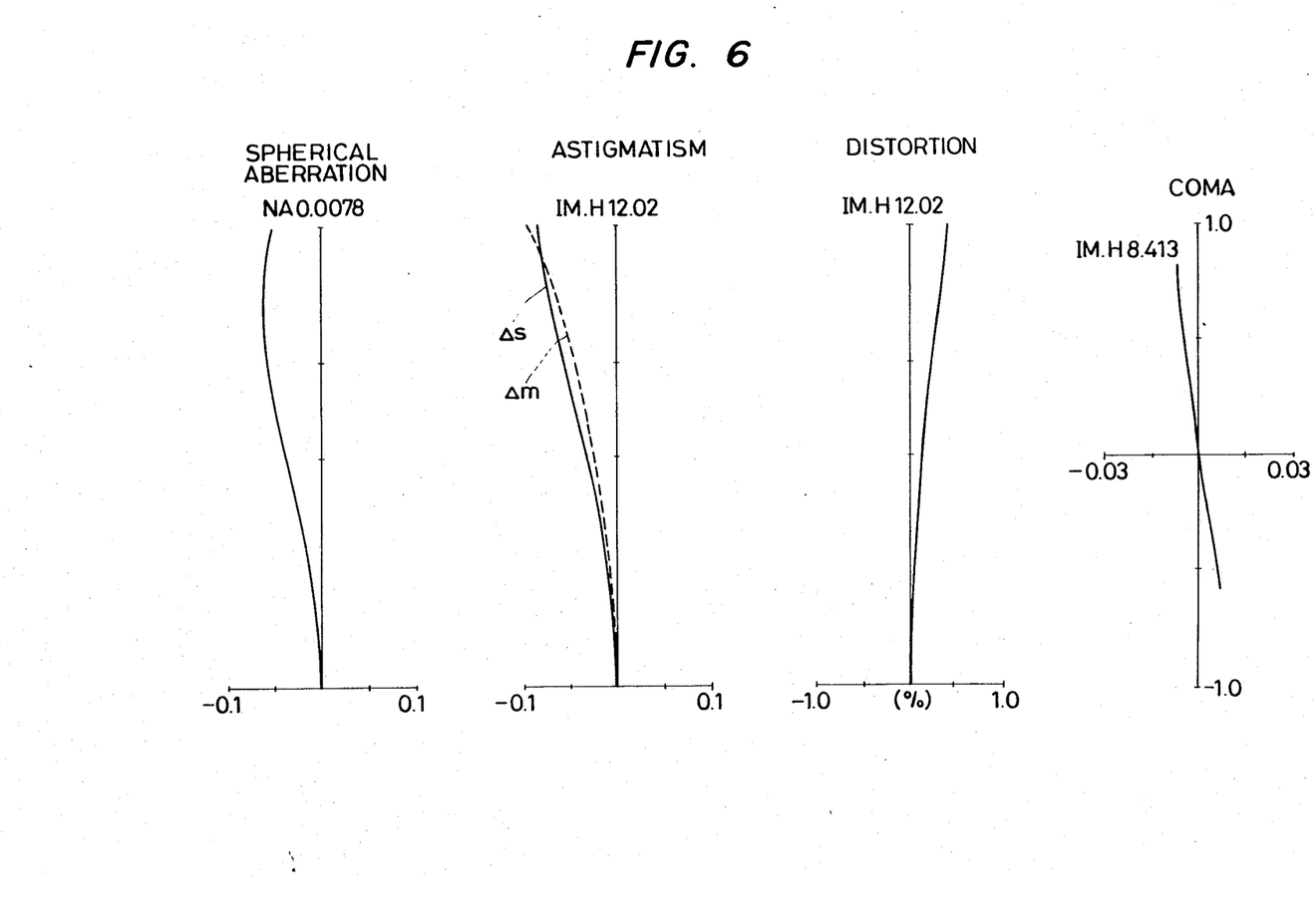
FIGS. 6 and 7 respectively show graphs illustrating averration curves of the lens system according to Embodiment 1 when it is focused by moving the intermediate lens group as a whole toward the image side.
Figure 7:
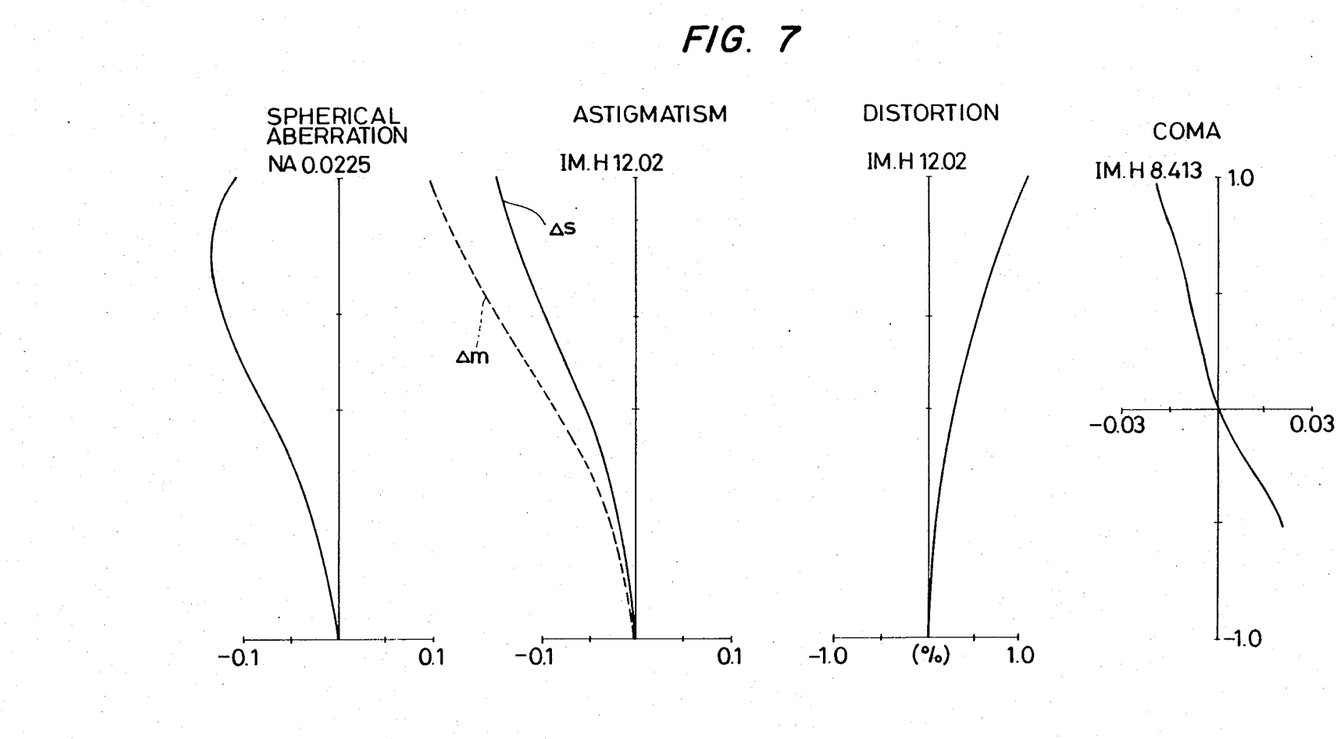

Out of respective embodiments shown in the above, Embodiment 1 is a lens system having the lens configuration shown in FIG. 1, wherein the intermediate lens group II comprises the first subunit IIa consisting of a biconcave lens and the second subunit IIb consisting of a negative cemented doublet, and is arranged to be focused by moving said subunits toward the image side. In this embodiment, the stop is located at the position of d=5.22 from and in rear of the surface on the image side of the second subunit IIb (surface $r_{13}$) and is moved together with the second subunit IIb. Aberration curves of Embodiment 1 when it is focused on the object points at the infinite distance and at short distances, i.e., −3056 and −1031, are as shown in FIGS. 3, 4 and 5 respectively. Besides, FIGS. 6 and 7 respectively show aberration curves of the same lens system when it is focused on the object points at the distances of −3056 and −1036 by moving the intermediate lens group II integrally toward the image side.

Figure 8:
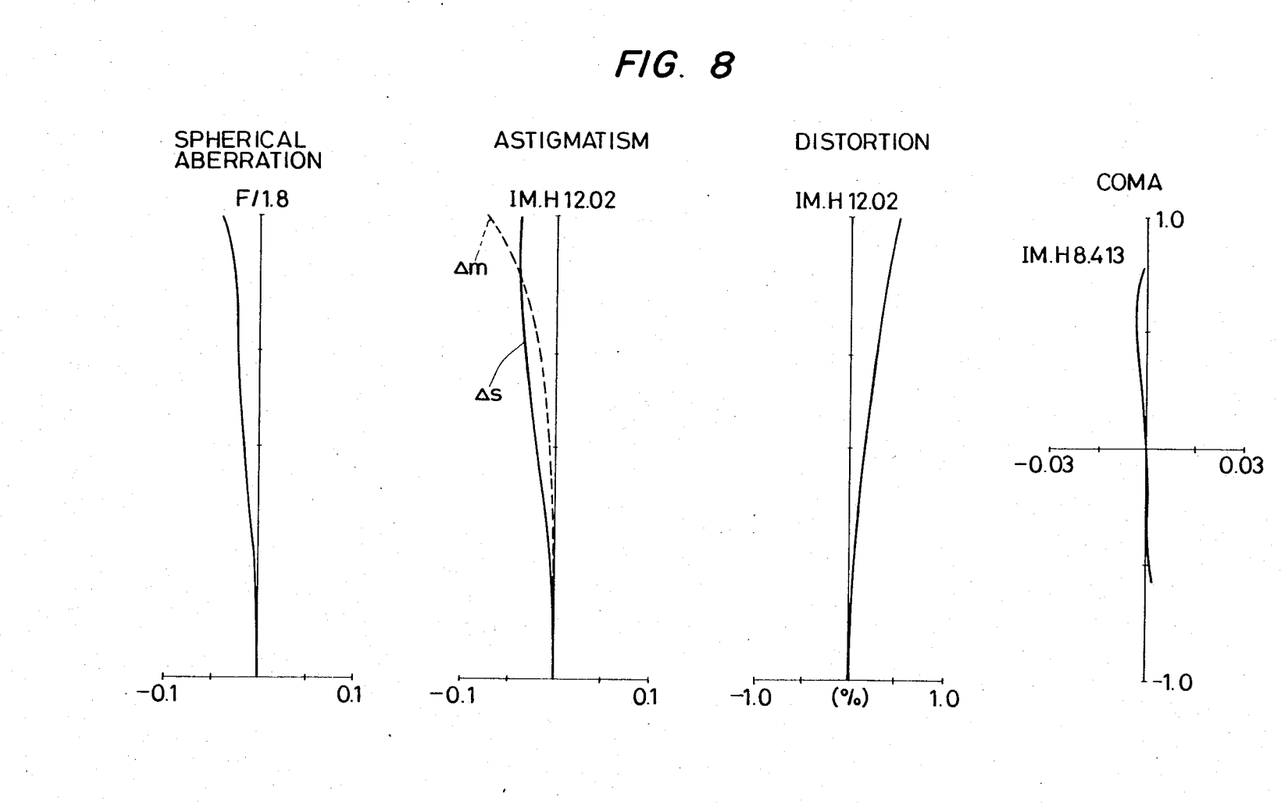
FIGS. 8 through 10 respectively show graphs illustrating aberration curves of Embodiment 2.
Figure 9:
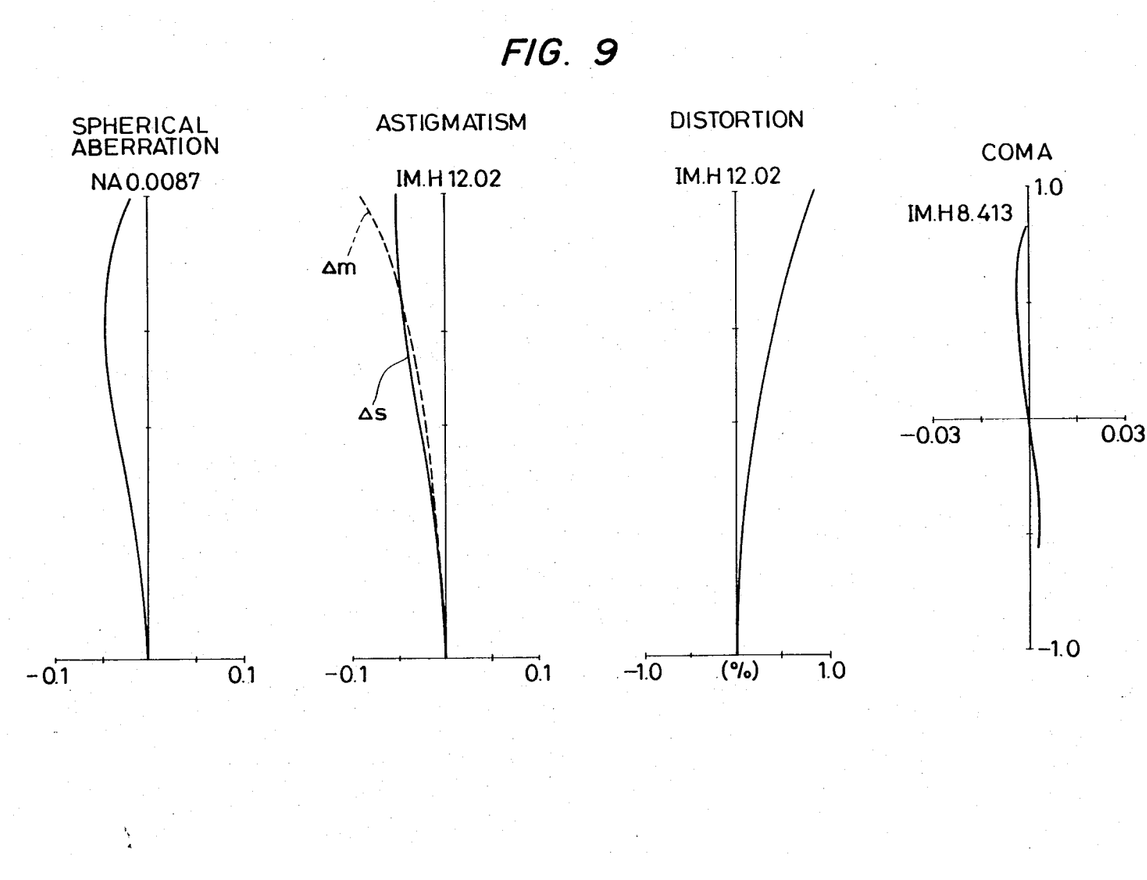
Figure 10:
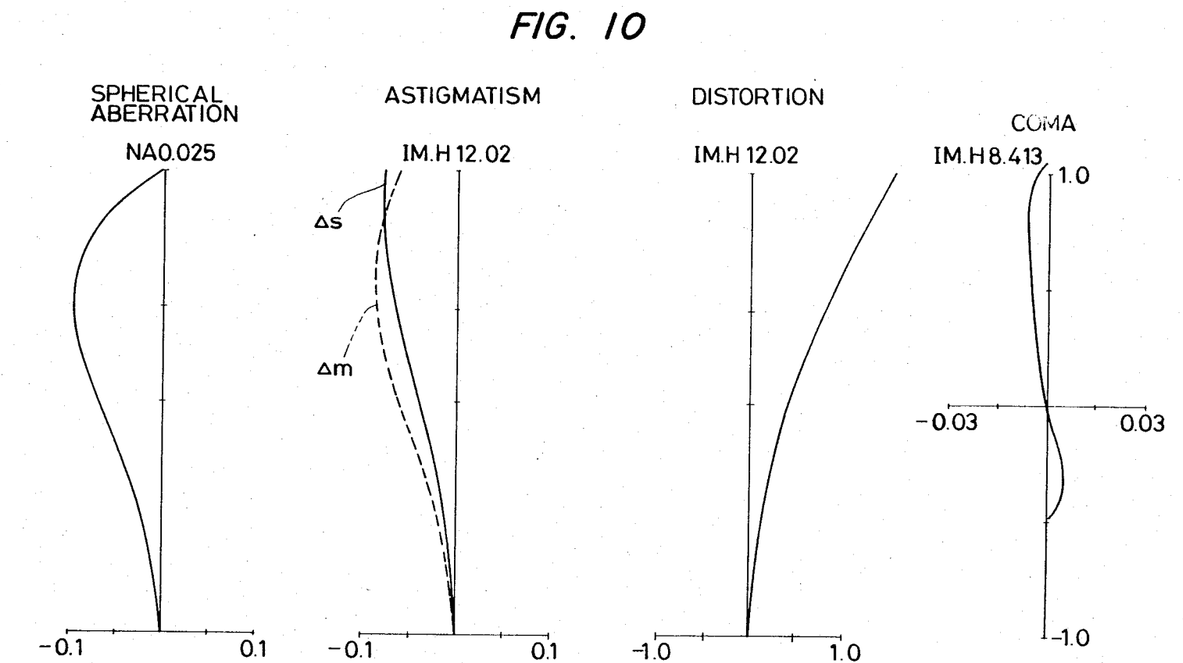
Figure 11:
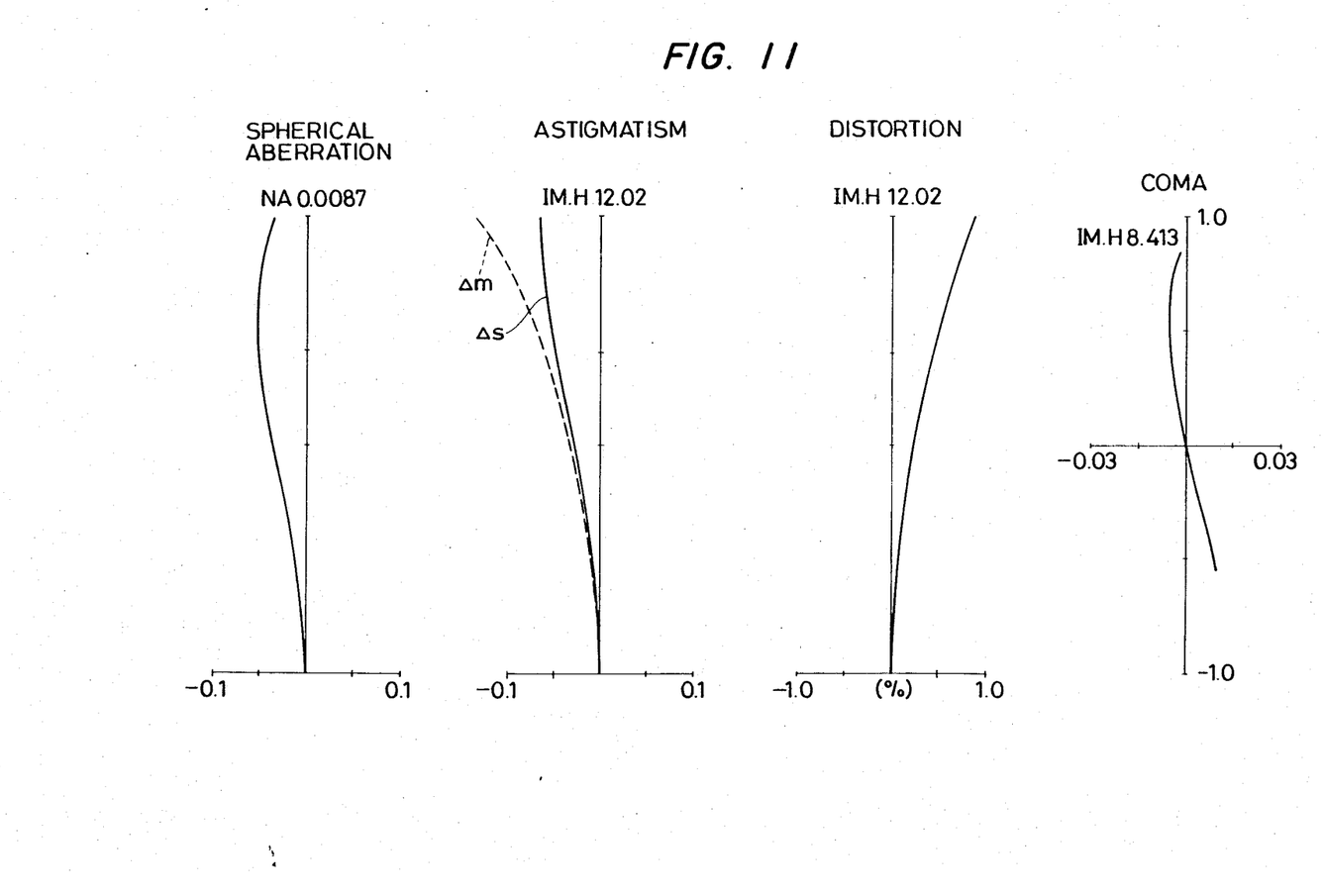
FIGS. 11 and 12 respectively show graphs illustrating aberration curves of the lens system according to Embodiment 2 when it is focused by moving the intermediate lens group as a whole toward the image side.
Figure 12:
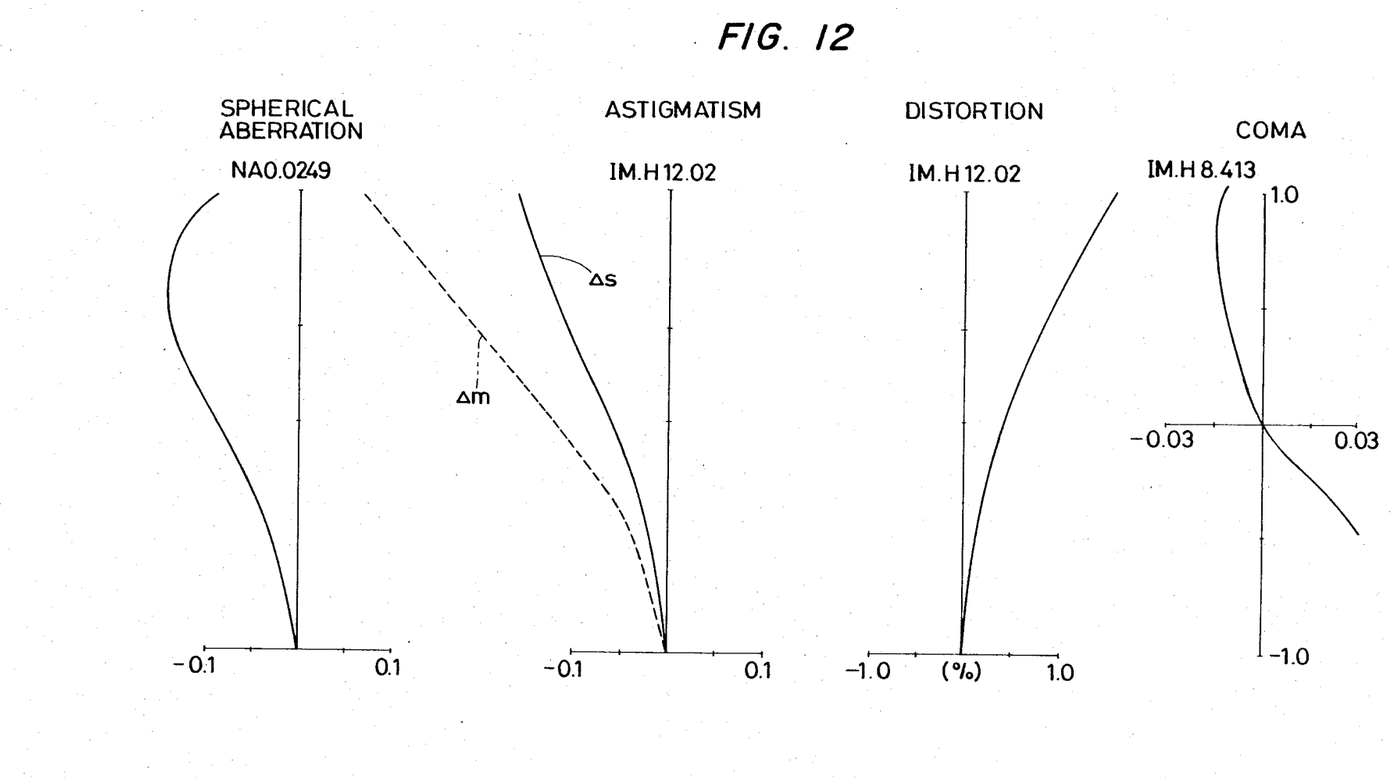

Embodiment 2 is a lens system having the lens configuration shown in FIG. 2, wherein the intermediate lens group II comprises the first subunit IIa consisting of a negative cemented doublet and the second subunit IIb also consisting of a negative cemented doublet, and is arranged to be focused by moving said subunits IIa and IIb toward the image side. In this embodiment, the stop is located at the position of d=5.27 from and in rear of the surface on the image side of the second subunit IIb (surface $r_{14}$) and is moved together with the second subunit IIb. Aberration curves of Embodiment 2 when it is focused on the object points at the infinite distance and at short distances, i.e., −3000 and −1011, are as shown in FIGS. 8, 9 and 10 respectively. Besides, FIGS. 11 and 12 respectively show aberration curves of the same lens system when it is focused on the object points at the distances of −3000 and −1011 by moving the intermediate lens group II integrally toward the image side.

As it will be evident from respective embodiments shown in the above, when the focusing method according to the present invention is adopted, aggravation of aberrations which occur when the lens system is focused on an object at a short distance becomes small compared with the known focusing method.

I claim:

1. A focusing method for a telephoto lens system comprising a front lens group having positive refractive power, an intermediate lens group having negative refractive power, and a rear lens group having positive refractive power, said focusing method for a telephoto lens system being arranged to divide said intermediate lens group into a first subunit and a second subunit and to focus said telephoto lens system by moving both of said subunits toward the image side by varying the distance between said subunits.

2. A focusing method for a telephoto lens system according to claim 1 wherein said focusing method for a telephoto lens system fulfills the conditions (1) and (2) shown below:

$$0.7 < \phi_b/\phi_a < 1.5 \quad (1)$$

$$1 < x_b/x_a \quad (2)$$

where, reference symbol $\phi_a$ represents the power of the first subunit, reference symbol $\phi_b$ represents the power of the second subunit, reference symbol $x_a$ represents the amount of movement of the first subunit, and reference symbol $x_b$ represents the amount of movement of the second subunit.

3. A focusing method for a telephoto lens system according to claim 1 wherein said first subunit comprises a single lens having negative refractive power and said second subunit comprises a doublet having negative refractive power.

4. A focusing method for a telephoto lens system according to claim 1 wherein said first subunit comprises a cemented doublet having negative refractive power and said second subunit also comprises a cemented doublet having negative refractive power.

5. A focusing method for a telephoto lens system according to claim 1 wherein said telephoto lens system further comprises a stop located in rear of said intermediate lens group, said focusing method for a telephoto lens system being further arranged to vary the diameter of said stop, at the time of focusing, so that the value of NA' on the exit side becomes a value expressed by the following formula:

$$NA' = NA/(1+\beta)$$

where, reference symbol NA represents the numerical aperture on the exit side when the lens system is focused on an object at the inifinite distance, and reference symbol $\beta$ represents the lateral magnification when the lens system is focused on an object at a finite distance.

6. A focusing method for a telephoto lens system according to claim 3 wherein said telephoto lens system is a lens system expressed by the following numerical data:

| $f = 100, F/2.0, 2\omega = 13.7°$ | | | |
|---|---|---|---|
| $r_1 = 49.723$ | | | |
| $d_1 = 10.27$ | $n_1 = 1.49700$ | $\nu_1 = 81.61$ | |
| $r_2 = -295.473$ | | | |
| $d_2 = 0.20$ | | | |
| $r_3 = 46.505$ | | | |
| $d_3 = 6.66$ | $n_2 = 1.61700$ | $\nu_2 = 62.79$ | |
| $r_4 = 171.355$ | | | |
| $d_4 = 3.00$ | | | |
| $r_5 = -576.598$ | | | |
| $d_5 = 2.73$ | $n_3 = 1.65412$ | $\nu_3 = 39.70$ | |
| $r_6 = 30.885$ | | | |
| $d_6 = 2.78$ | | | |
| $r_7 = 39.886$ | | | |
| $d_7 = 6.09$ | $n_4 = 1.49700$ | $\nu_4 = 81.61$ | |
| $r_8 = 336.723$ | | | |
| $d_8$ (variable) | | | |
| $r_9 = -163.418$ | | | |
| $d_9 = 3.10$ | $n_5 = 1.50378$ | $\nu_5 = 66.81$ | |
| $r_{10} = 99.461$ | | | |
| $d_{10}$ (variable) | | | |
| $r_{11} = 320.766$ | | | |
| $d_{11} = 3.89$ | $n_6 = 1.68893$ | $\nu_6 = 31.08$ | |
| $r_{12} = -49.512$ | | | |
| $d_{12} = 1.67$ | $n_7 = 1.52682$ | $\nu_7 = 51.12$ | |
| $r_{13} = 30.977$ | | | |
| $d_{13}$ (variable) | | | |
| $r_{14} = 71.958$ | | | |
| $d_{14} = 3.67$ | $n_8 = 1.7880$ | $\nu_8 = 47.43$ | |
| $r_{15} = -42.169$ | | | |
| $d_{15} = 1.40$ | | | |
| $r_{16} = -39.083$ | | | |
| $d_{16} = 1.38$ | $n_9 = 1.60342$ | $\nu_9 = 38.01$ | |
| $r_{17} = 26.172$ | | | |
| $d_{17} = 4.13$ | $n_{10} = 1.67790$ | $\nu_{10} = 55.33$ | |
| $r_{18} = -833.973$ | | | |
| $\phi_a = -0.818$ | $\phi_b = -1.142$ | | | where, reference symbols $r_1$ through $r_{18}$ respectively represent radii of curvature of respective lens surfaces, reference symbols $d_1$ through $d_{17}$ respectively represent thicknesses of respective lenses and airspaces between respective lenses, reference symbols $n_1$ through $n_{10}$ respectively represent refractive indices of respective lenses, reference symbols $\nu_1$ through $\nu_{10}$ respectively represent Abbe's numbers of respective lenses, $\phi_a$ and $\phi_b$ represent the respective powers of said first and second subunits, and reference symbol f represents the focal length of the lens system as a whole.

7. A focusing method of a telephoto lens system according to claim 4 wherein said telephoto lens system is a lens system expressed by the following numerical data:

| $f = 100, F/1.8, 2\omega = 13.7°$ | | | |
|---|---|---|---|
| $r_1 = 51.290$ | | | |
| $d_1 = 10.99$ | $n_1 = 1.49700$ | $\nu_1 = 81.61$ | |
| $r_2 = -257.523$ | | | |
| $d_2 = 0.19$ | | | |
| $r_3 = 48.023$ | | | |
| $d_3 = 7.05$ | $n_2 = 1.61700$ | $\nu_2 = 62.79$ | |
| $r_4 = 184.055$ | | | |
| $d_4 = 2.95$ | | | |
| $r_5 = -425.917$ | | | |
| $d_5 = 2.82$ | $n_3 = 1.65412$ | $\nu_3 = 39.70$ | |
| $r_6 = 31.502$ | | | |
| $d_6 = 2.85$ | | | |
| $r_7 = 38.755$ | | | |

| | | |
|---|---|---|
| $d_7 = 6.43$ | $n_4 = 1.49700$ | $\nu_4 = 81.61$ |
| $r_8 = 396.639$ | | |
| $d_8$ (variable) | | |
| $r_9 = -89.189$ | | |
| $d_9 = 3.67$ | $n_5 = 1.73400$ | $\nu_5 = 51.49$ |
| $r_{10} = -53.471$ | | |
| $d_{10} = 2.04$ | $n_6 = 1.46450$ | $\nu_6 = 65.94$ |
| $r_{11} = 85.186$ | | |
| $d_{11}$ (variable) | | |
| $r_{12} = 304.044$ | | |
| $d_{12} = 4.12$ | $n_7 = 1.68893$ | $\nu_7 = 31.08$ |
| $r_{13} = -51.869$ | | |
| $d_{13} = 1.65$ | $n_8 = 1.52682$ | $\nu_8 = 51.12$ |
| $r_{14} = 29.373$ | | |
| $d_{14}$ (variable) | | |
| $r_{15} = 69.887$ | | |
| $d_{15} = 4.44$ | $n_9 = 1.78800$ | $\nu_9 = 47.43$ |
| $r_{16} = -43.890$ | | |
| $d_{16} = 1.20$ | | |
| $r_{17} = -42.811$ | | |
| $d_{17} = 1.39$ | $n_{10} = 1.61293$ | $\nu_{10} = 37.00$ |
| $r_{18} = 27.804$ | | |
| $d_{18} = 4.20$ | $n_{11} = 1.67790$ | $\nu_{11} = 55.33$ |
| $r_{19} = -355.714$ | | |
| $\phi_a = -0.851$ | $\phi_b = -1.214$ | | where, reference symbols $r_1$ through $r_{19}$ respectively represent radii of curvature of respective lens surfaces, reference symbols $d_1$ through $d_{18}$ respectively thicknesses of respective lenses and airspaces between respective lenses, referency symbols $n_1$ through $n_{11}$ respectively represent refractive indices of respective lenses, reference symbols $\nu_1$ through $\nu_{11}$ respectively represent Abbe's numbers of respective lenses, $\phi_a$ and $\phi_b$ represent the respective powers of said first and second subunits, and reference synbol f represents the focal length of the lens system as a whole.

* * * * *